Nov. 3, 1925.  1,560,333
M. W. CARTY
APPARATUS FOR SEPARATING SOLID PARTICLES FROM A GAS STREAM CONTAINING THEM
Filed Nov. 22, 1922  2 Sheets-Sheet 1
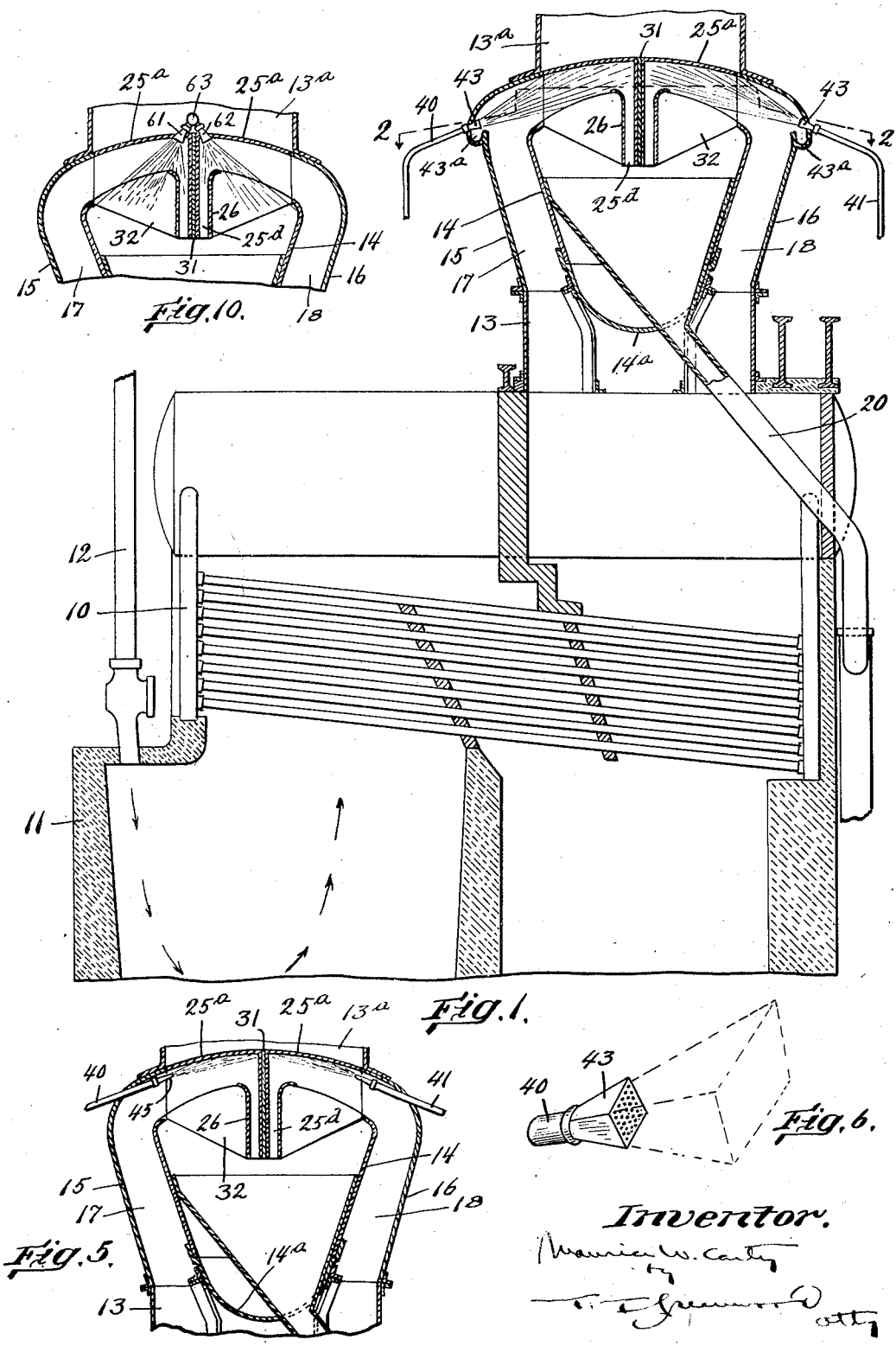
Inventor.
Maurice W. Carty Nov. 3, 1925.
M. W. CARTY
1,560,333
APPARATUS FOR SEPARATING SOLID PARTICLES FROM A GAS STREAM CONTAINING THEM
Filed Nov. 22, 1922
2 Sheets-Sheet 2
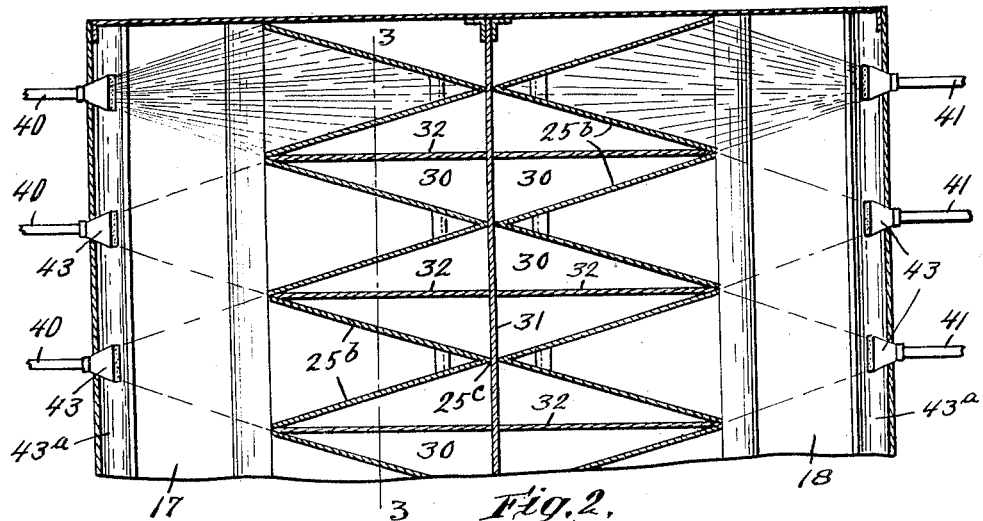
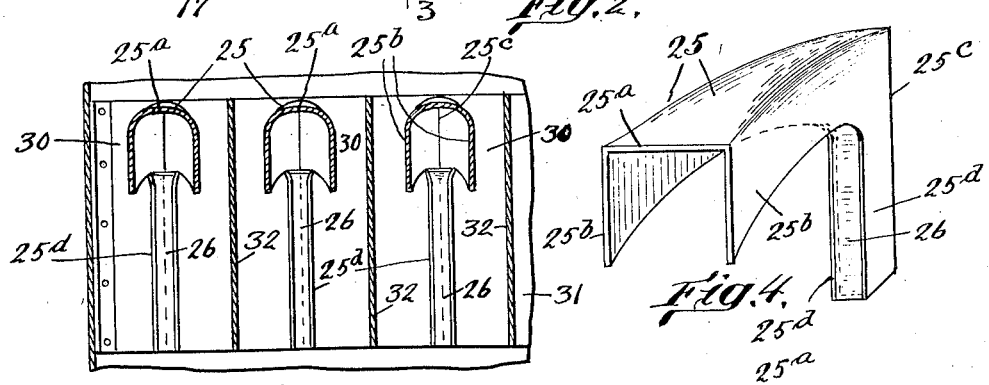
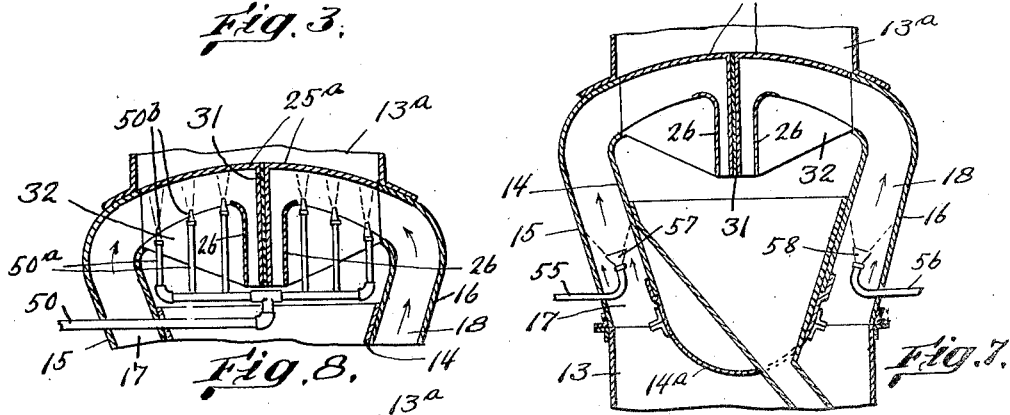
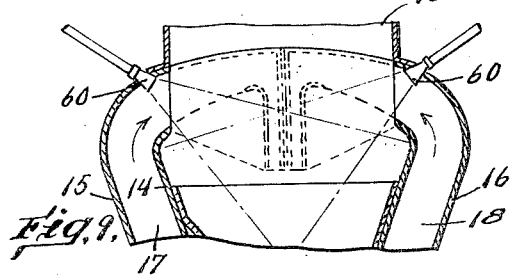

Patented Nov. 3, 1925.

1,560,333

UNITED STATES PATENT OFFICE.

MAURICE W. CARTY, OF BOSTON, MASSACHUSETTS.

APPARATUS FOR SEPARATING SOLID PARTICLES FROM A GAS STREAM CONTAINING THEM.

Application filed November 22, 1922. Serial No. 602,637.

*To all whom it may concern:*

Be it known that I, MAURICE W. CARTY, a citizen of the United States, residing in Boston, in the county of Suffolk and State of Massachusetts, have invented an Improvement in Apparatus for Separating Solid Particles from a Gas Stream Containing Them, of which the following is a specification.

This invention relates to apparatus for the separation of solid particles, as finely divided dust particles, from a gas stream containing them, and especially for the separation of the finely divided solid waste products of combustion contained in the hot waste gases of a boiler furnace wherein pulverized coal is utilized as a fuel.

The ash resulting from the burning of pulverized coal is finely divided and, by reason of the consequent small weight of the ash or dust particles, said particles tend to remain in suspension in and be carried along with the waste gases and the separation of the dust particles from the gas stream presents considerable difficulty.

An object of my invention is the provision of apparatus arranged especially to separate finely divided dust particles from a hot gas stream containing them.

My apparatus may include, broadly, means to sub-divide the dust laden gas stream into small streams and load the dust particles in the small streams and impart a centrifugal effect to the small streams, whereby to separate the loaded dust particles from the gas streams. The hot gas stream may be guided in a duct and a suitable dust-loading medium, as water, may be injected into the stream, and preferably in the direction of motion of the gas stream in the duct, whereby to load the dust particles and the duct may be constructed and arranged so as subsequently to separate the loaded dust particles, and excess water, from the gas stream. The water may be injected into substantially the entire cross-sectional area of the duct, or it may be injected into only a portion of the cross-sectional area, as conditions may indicate.

This invention is also intended as in improvement on my copending application Serial No. 392,390, filed June 28, 1920.

A further object is generally to improve the construction and operation of apparatus for separating solid particles for gas streams.

Fig. 1 is a sectional elevation of a steam boiler and furnace embodying my invention.

Fig. 2 is a plan sectional detail along line 2—2 of Fig. 1.

Fig. 3 is a sectional detail along line 3—3 of Fig. 2.

Fig. 4 is a perspective view of a separator element.

Fig. 5 is a sectional elevation of separator apparatus of Fig. 1 illustrating a modified arrangement of the water pipes.

Fig. 6 is a perspective view of a water nozzle.

Fig. 7 is a view similar to Fig. 5 but illustrating nozzles disposed in the uptake to the separator elements.

Fig. 8 is a sectional detail illustrating a modified application of nozzles in the separator elements.

Fig. 9 is a detail of the separator apparatus with the separator elements removed and illustrating the method of disposing water nozzles to direct jets of water into and laterally across the gas streams flowing from the vertical passages into the uptake above the hopper.

Fig. 10 is a detail illustrating a modified arrangement of the water jets.

As here shown, my invention is applied to a power plant including a boiler 10 mounted over the boiler furnace 11. Said furnace is or may be adapted to burn pulverized fuel which may be introduced in the furnace through the pipe 12, and the hot gases containing the finely divided solid particles, as ash, may be carried along in the direction of the arrows through the boiler and into the uptake 13.

A hopper 14 for the dust particles is disposed in the uptake 13 above the boiler and is or may be spaced from the opposite side walls 15 and 16 thereof whereby to separate the uptake into two opposed substantially vertical passages or ducts 17 and 18 arranged on opposite sides of said hopper and through which passages the hot and dust-laden gases are adapted to pass. Preferably, said passages incline outwardly and thence inwardly and somewhat upwardly over the top of said hopper, whereby to discharge the gas streams over the hopper into the upper portion 13ª of the uptake and permit cinders to fall into the dead gas space in said hopper. Cinders may be removed from the hopper by the pipe 20 which is sealed at its lower end whereby to prevent an upward flow of air therein which might be induced by the draft in the uptake.

The bottom portion 14ª of said hopper 14 is preferably of curved formation whereby to facilitate the flow of the gas stream into said lateral passages 17 and 18.

The separator apparatus includes a plurality of substantially horizontally disposed separator elements 25 all of which, preferably, are similar in construction and are disposed over the cinder hopper to receive the gas streams discharged from the upper end of the passages 17 and 18. Each separator element may provide a substantially V-shaped or pyramidal shaped compartment and may be formed preferably of sheet material and may have the top wall 25ª which, preferably, is inclined slightly upward to conform to and extend to the curved formation of the outer walls 15 and 16 of the uptake at the upper ends of said passages 17 and 18. The separator element also includes the two downwardly extended side walls 25ᵇ which are or may be formed integrally with the top wall, and said side walls are convergent and are contiguous at the apex 25ᶜ and, at said apex, are arranged to enclose a dead gas space. Said side walls are or may be formed with the depending extensions 25ᵈ at the apex of the element whereby to form a chute or guide passage adapted to conduct downwardly into the cinder hopper, the dust particles projected from the gas stream into the dead gas space in the apex of the elements. A plate 26 may form a closure for the space between said depending extensions 25ᵈ, and said plate may extend upward substantially to the lower edge of the side plates 25ᵇ.

The separator element is formed with a gas entrance at the end or base thereof and said separator element is preferably substantially rectangular at the entrance and the top and side walls thereof preferably merge gradually from a rectangular section at the entrance to a semi-cylindrical section toward the apex, as illustrated more particularly in Fig. 3.

The bottom of the separator element is open for the free passage of the gas stream out of the element and, preferably, the lower edges of said side walls 25ᵇ are extended slightly upward from the entrance to the apex, whereby to facilitate the passage of the gas stream out of the element.

Preferably, the separator apparatus includes a plurality of separator elements, and said elements are arranged to receive the gas streams issuing from the passages 17 and 18 of the uptake and divide them into a plurality of smaller streams and act upon the smaller streams to remove solid particles therefrom. Said separator elements are or may be disposed in the uptake in two opposed, substantially horizontal, rows over the hopper and the entrances thereof are arranged at the exit of the uptake passages 17 and 18 whereby to receive the gas streams discharged from said passages. The gas stream is arranged to pass into the separator elements and flow out of the open bottoms thereof and laterally around the lower edges of the side walls 25ᵇ and thence upwardly through the passages 30 between the separator elements and into the upper portion 13ª of the uptake.

A connecting and separating plate 31 may be extended between the apices of the separator elements and other and transversely arranged plates 32 may be disposed between the separator elements and may extend below the bottom edges of the side walls of separator elements whereby to isolate and prevent interference between the gas streams which pass over the lower edges of the side walls of adjacent separator elements and thereby prevent eddy currents and reduce draft loss.

By reason of the shape of the uptake passages 17 and 18, and the separator elements, the gas stream, in entering said elements, is changed more or less abruptly in direction, or has a centrifugal motion imparted to it, and the dust particles are or may be forced to or concentrated in the upper or outer portion of the gas stream, or adjacent the top walls 25ª of the separator elements. The gas stream in the element is also constrained to move downwardly out of the elements and, by reason of the change of direction of motion of the gas stream, dust particles are projected beyond the gas stream and into the dead gas spaces in the apices of the elements, and fall downwardly through the depending chutes into the hopper 14. The direction of motion of the gas stream is also changed abruptly as the gas stream flows about the lower edges 25ᵇ of the separator elements and upwardly into the spaces between said elements and dust particles remaining in the gas streams are or may be projected downwardly beyond the gas streams and into the dead gas space in the hopper.

The dust particles resulting from the combustion of pulverized fuel are very finely divided and have relatively small weight. Consequently, while the centrifugal effect on the dust particles by a change in direction of motion of the gas stream may force them to the outer portion of the stream yet the momentum of said particles may be insufficient to cause them to be projected from the gas stream.

It is an object of this invention to load the dust particles, or increase the weight thereof, by a suitable dust-loading medium whereby they will be strongly influenced by a centrifugal effect and be protected from the gas stream containing them. For loading the dust particles, I may expose the gas stream in said separator apparatus to the action of water which may contact with and adhere to the dust particles and consequently render them more susceptible to a centrifugal effect.

Figs. 1 and 2 illustrate the preferred arrangement of the separator apparatus. Water supply pipes 40 and 41 are or may be extended through the upper portion of the outer walls 15 and 16 of the boiler uptake, and at the bend in the ducts 17 and 18 and said pipes terminate in the nozzles 43. Said nozzles may be of any suitable shape and may have a square and perforated end face as illustrated in Fig. 6, or they may be otherwise formed. Preferably, said nozzles are so arranged as to inject a plurality of relatively coarse and spaced solid jets or streams across the bends in the ducts 17 and 18 and into the entrance of the separator elements. The jets of water are adapted to spray into substantially the entire cross-sectional area of the duct, yet the gas spaces between the individual jets are adapted to be such that the gas streams can pass freely through the separator elements without undue opposition. Preferably, the nozzles are so arranged that the jets of water are directed mainly toward and into the dead gas spaces in the apices of the elements so that the water from said nozzles, and the dust particles carried along by the water jets, or separated from the gas stream in the elements, is delivered into the apices of the elements and thence through the depending chutes into the hopper.

The jets of water are adapted to have a velocity somewhat greater than the velocity of the gas stream in said elements whereby to avoid being broken up and carried along with or vaporized by the gas stream.

The arrangement of the apparatus is such that the gas stream in the separator elements passes laterally between the water jets in such a manner that, at some point in its path of travel through the separator elements, practically every part of the gas stream is traversed by a jet of water. The dust particles become loaded with water upon contact with a water jet and may be carried along with the jets or, by reason of the loading and increased weight of the dust particles, may be acted upon by centrifugal force as the gas stream is deflected downward in the elements, and projected into the apices of the elements. A large proportion of the jets of water from the nozzles impinge against the walls of the separator elements and spatter or are deflected from the walls at various angles into the gas streams and thereby enhance the dust-loading action of the apparatus. Any water entrained with the gas streams may be projected either into the apices of the separator elements by the centrifugal action of the gas streams in said elements, or into the hopper as said streams pass over the lower edges of the side walls of and upwardly between the separator elements.

The jets of water are adapted to wet the inner surfaces of the separator elements, and dust particles brought into contact with said wetted surfaces will be caught and swept into the dead gas spaces in the apices of the elements, or otherwise delivered into the hopper.

Preferably, said nozzles 43 are arranged within recesses 43$^a$ in the side walls of the ducts 17 and 18 whereby any drip from said nozzles may fall and be caught in the lower portion of said recesses and drained off in any suitable or desirable manner. Said separator elements and hopper are preferably made of a noncorrosive material. It is not considered necessary to make the uptake of such material inasmuch as substantially all water is removed from the gas stream in the separator elements.

In Fig. 5, I have illustrated a modification wherein the nozzles 45 are arranged to direct streams or jets of water into the upper portions only of the gas streams in the separator elements and also against the top wall of the elements. Due to the centrifugal effect resulting from the change in direction of motion of the gas streams in said elements, the dust particles may be concentrated in the upper portions of the gas streams and thereby are brought into contact with the water and loaded and consequently removed by centrifugal action, and also by the scouring effect of the water streams, and delivered into the apices of the elements. Loaded dust particles may also be projected from the gas stream at the lower edges of the side walls of the elements.

In Fig. 8, a modification is illustrated wherein a water suply pipe 50 has a plurality of vertical extensions 50$^a$ which terminate in discharge nozzles 50$^b$, and said nozzles are or may be arranged to discharge a plurality of sheets or jets of water substantially vertically upward through the open bottoms of and into the separator elements, and the gas streams in the separator elements are constrained to pass through said water sheets, or jets.

In Fig. 7, water supply pipes 55 and 56 extend into the uptake passages 17 and 18 and terminate in nozzles 57 and 58, similar to said nozzles 43, which are arranged to direct jets of water into said passages in the general direction of flow of the gas stream in said passages, and the action of the water jets, in general, is as described in connection with Fig. 1, whereby the gas streams and the dust particles, are compelled to pass through the water jets. With this arrangement, the side walls 15 and 16 of the uptake are preferably made of some non-corrosive material. Said nozzles 57 and 58 may be combined with the nozzles 43 illustrated in Fig. 1, or those of Fig. 8, or either set of nozzles may be used independently.

The separator apparatus is also effective to remove excess water from the gas stream and discharge it into the hopper, and the water discharged into the hopper may serve to sluice out the hopper and carry the dust particles out of the hopper through the pipe 20. The dust particles are or may be also automatically removed from the separator elements, to which they may adhere, by the action of the water jets.

In Fig. 9, the separator elements are omitted and the removal of the dust particles is effected by the change in direction of movement of the gas streams as they leave the ducts 17 and 18 and enter the uptake. Spray nozzles 60 are disposed in said ducts and are arranged to direct jets of water through the exit passages of the ducts and transversely downward along and through the gas streams issuing from said exit passages. The downward inclination of said jets preferably is such that the jets are projected mainly into the hopper rather than into the opposite gas duct. Said arrangement may also be used in connection with the separator elements which are indicated by dotted lines.

In Fig 10, a modification is illustrated wherein a water supply pipe 63 is extended over the top of the separator elements and nozzles 61 and 62 project through the opposed separator elements adjacent the apices thereof and are arranged to direct streams of water, in the form of jets or sprays, downwardly through the gas stream in the separator elements and into the hopper. The action of the water stream is substantially as previously described.

The apparatus is so arranged that the time the water is in contact with each dust particle before it is separated from the gases is so short that the water carrying the dust particles is not vaporized to a point that will interfere with the action before the dust particles are separated from the gases even though the temperature of the gases may remain considerably above the boiling point of the water.

While water of any desirable temperature may be used to load the dust particles, I prefer to employ water at a relatively high temperature whereby to reduce the cooling action of the water on the hot gas stream, yet the water should not be so hot as to become vaporized in the short distance that it is in contact with the hot gas stream, as the dust particles will be released and the effect of water injection nullified.

The invention may be otherwise modified without departing from the spirit thereof.

I claim:

1. Apparatus for separating solid particles from a gas stream comprising the combination of means to provide a dead gas space, means to establish a suction effect in said dead gas space, a duct to guide the gas stream over and in communication with said dead gas space, and means to direct a jet of water into the gas stream in substantially the direction of motion of the gas stream over said dead gas space.

2. Apparatus for separating solid particles from a gas stream comprising the combination of a bent duct to guide the gas stream, means to direct a jet of water into the bend of the duct only in substantially the direction of motion of the gas stream therein while preserving substantially the velocity of the gas stream in the bend of the duct, and means disposed in the path of the gas stream beyond the bent duct arranged to separate water and solid particles out of the gas stream, said means including means to provide a dead gas space and means abruptly to change the direction of motion of gas stream over and in communication with said dead gas space.

3. Apparatus for separating dust particles from a gas stream comprising the combination of means to concentrate the dust particles largely in one portion of the gas stream, and means to introduce a dust-loading medium mainly into that portion only of the gas stream, whereby to load the dust particles, and means to separate the loaded particles from the gas stream.

4. Apparatus for separating dust particles from a gas stream comprising the combination of a substantially horizontal duct having an entrance for the dust laden gases and a bottom exit for the gases, and means to inject water into the duct and across the bottom exit and substantially in the direction of the movement of the gas stream in the duct.

5. Apparatus for separating dust particles from a gas stream comprising the combination of a duct having an entrance for the dust laden gases and a bottom exit for the gases, and means to inject water mainly into the upper portion of the gas stream in the duct substantially in the direction of movement of the gas stream in the duct.

6. Apparatus for separating dust particles from a gas stream comprising the combination of a duct having an entrance for the dust laden gases and a bottom exit for the gases, said duct having means arranged to guide the gas stream therein in a manner to concentrate the dust particles in the gas stream largely into the upper portions of the duct above the bottom exit, and means to inject water mainly into the upper portion of the gas stream in the duct substantially in the direction of movement of the gas stream in the duct.

7. Apparatus for separating dust particles from a gas stream comprising the combination of a horizontal duct having an end-entrance for the dust laden gases and an approximately horizontal bottom-exit for the gases, and means to inject horizontal jets of water into said duct and across the bottom-exit.

8. Apparatus for separating dust particles from a gas stream comprising the combination of a duct having a gas entrance and a dead gas space opposite the entrance and a gas exit between the entrance and said dead gas space, and means to direct jets of water through the entrance and toward the dead gas space of said duct.

9. Apparatus for separating dust particles from a gas stream comprising the combination of a duct having a gas entrance and a dead gas space opposite the entrance and a gas exit between the entrance and said dead gas space, and means to direct jets of water through the entrance and across the exit of said duct.

10. Apparatus for separating dust particles from a gas stream comprising a duct adapted to be located in the gas stream and having a gas entrance and a dead gas space at the end opposite the entrance and constructed and arranged to direct its gas stream toward said dead gas space and to change the direction of its gas stream abruptly between the gas entrance and said space, the entrance to said space being open, and means to inject water in the gas stream in said duct between the entrance and the dead gas space thereof.

11. Apparatus for separating dust particles from a gas stream comprising a duct adapted to be located in the gas stream and having a gas entrance and a dead gas space at the end opposite the entrance and constructed and arranged to direct its gas stream toward said dead gas space and to change the direction of its gas stream abruptly between the gas entrance and said space, the entrance to said space being open, and means to inject water in the gas stream in said duct between the entrance and the dead gas space thereof and in substantially the direction of motion of the gas stream in said duct.

12. Apparatus for separating dust particles from a gas stream comprising the combination of a duct adapted to be located in the gas stream and having a gas entrance and a dead gas space at the end opposite the gas entrance, the cross-sectional area of the duct decreasing from its entrance toward said space, said duct having a gas exit in the decreasing portion of it and the passage through the duct being substantially free, and the duct being constructed and arranged to direct its gas stream toward said dead gas space and to change the direction of its gas stream abruptly between the gas entrance and said space, the entrance to said dead gas space being open, and means to inject water in the gas stream in said duct between the entrance and the dead gas space thereof.

13. Apparatus for separating dust from a gas stream comprising the combination of a vertical flue having a dead gas space at the bottom thereof, a horizontal duct located in the gas stream and having a gas entrance and a dead gas space at the end opposite the gas entrance of the duct, said duct being constructed and arranged to direct the gas stream toward said space, and having an opening at the bottom to provide a gas exit between its gas entrance and said space disposed above the dead gas space in said flue, and means to introduce water into the gas stream in said duct.

14. Apparatus for separating dust particles from a gas stream comprising the comprising the combination of a horizontal duct having a gas entrance and a dead gas space at the end opposite the gas entrance of the duct, said duct being constructed and arranged to direct the gas stream toward said space, and having an opening in the bottom to provide a gas exit between its gas entrance and said space, and means to introduce a dust-loading medium into the gas stream in said duct.

15. Apparatus for separating dust particles from a gas stream comprising the combination of a horizontal duct having a gas entrance and a dead gas space at the end opposite the gas entrance of the duct, said duct being constructed and arranged to direct the gas stream toward said space, and having an opening at the bottom to provide a gas exit between its gas entrance and said space and means to introduce a dust-loading medium into the gas stream in said duct between the entrance and dead gas space of said duct.

16. Apparatus for separating dust particles from a gas stream comprising the combination of a horizontal duct having a gas entrance and a dead gas space at the end opposite the gas entrance of the duct, said duct being constructed and arranged to direct the gas stream toward said space, and having an opening at the bottom to provide a gas exit between its gas entrance and said space, and means to inject water into the gas stream in said duct in substantially the direction of the gas stream.

17. Apparatus for separating dust particles from a gas stream comprising in combination of vertically-spaced plates having their lengths extended in the direction of gas entrance to the plates, means to guide the gas stream in between said plates and down over the lower edges thereof and thence upwardly between said plates, a receptacle disposed beneath the lower edges of said plates arranged to provide a dead gas space below said plates, and means to introduce a dust-loading medium into the gas stream between said plates.

18. Apparatus for separating dust particles from a gas stream comprising the combination of vertically-spaced plates having their lengths extended in the direction of gas entrance to the plates, means to guide the gas stream in between said plates and down over the lower edges thereof and thence upwardly between said plates, a receptacle disposed beneath the lower edges of said plates arranged to provide a dead gas space below said plates, and means to inject water into the gas stream between said plates.

19. Apparatus for separating dust particles from a gas stream having a plurality of elements, and passages between said elements, said elements having compartments and openings in the bottom of said compartments, means to direct the gas stream into said compartments through the openings in the bottom upwardly through the passages between the elements, a receptacle for dust particles disposed beneath the openings in the bottoms of the compartments in said elements, and means to introduce a dust-loading medium into the compartments of said elements.

20. Apparatus for separating dust particles from a gas stream having a plurality of elements, and passages between said elements, said elements having compartments and openings in the bottom of said compartments, means to direct the gas stream into said compartments and through the openings in the bottoms upwardly through the passages between the elements, a receptacle for dust particles disposed beneath the openings in the bottoms of the compartments in said elements, and means to inject water into the compartments of said elements.

21. Apparatus for separating dust particles from a gas stream comprising the combination of means to provide a V-shaped compartment open at the base and at the bottom adapted to be placed in the gas stream, and means to introduce a dust-loading medium in said compartment.

22. Apparatus for separating dust particles from a gas stream comprising the combination of means to provide a V-shaped compartment open at the base and at the bottom adapted to be placed in the gas stream, and means to direct water in said compartment in the direction of motion of the gas stream therein.

23. Apparatus for separating dust particles from a gas stream comprising the combination of means to provide a horizontal compartment open at one end and at the bottom, means to direct a gas stream in said compartment comprising a vertically arranged duct having a substantially horizontal upper end portion in communication with the open end of said compartment and means to direct water into said horizontal compartment.

24. Apparatus for separating dust particles from a gas stream comprising the combination of means to provide a horizontal compartment open at one end and at the bottom, means to direct a gas stream in said compartment comprising a vertically-arranged duct having a substantially horizontal upper end portion in communication with the open end of said compartment, and means to direct water into said compartment in substantially the direction of motion of the gas stream therein.

25. Apparatus for separating dust particles from a gas stream comprising the combination of means to provide a horizontal compartment open at the end and the bottom and having a dead gas space opposite the open end, means to introduce a dust-loading medium into said compartment, whereby the loaded dust particles may be projected from the gas stream into said dead gas space, and a hopper arranged to provide a dead gas space disposed beneath said compartment and in communication with said dead gas space to receive the loaded dust particles.

26. Apparatus for separating dust particles from a gas stream comprising means to provide a dead gas space, means to divide the gas stream into a plurality of smaller gas streams and change the direction of motion of the small gas streams over and in free communication with said dead gas space, and individual means to introduce a dust-loading medium into each of the small gas streams in the aforesaid means.

27. Apparatus for separating dust particles from a gas stream comprising means to provide a dead gas space, means to divide the gas stream into a plurality of smaller gas streams and change the direction of motion of the small gas streams over and in free communication with said dead gas space, and means to direct water into said small gas streams in substantially the direction of gas entrance to said dividing means.

28. Apparatus for separating dust particles from a gas stream comprising means to provide a dead gas space, a duct for the dust-laden gases disposed above said dead gas space, said duct having a gas entrance, a gas exit, and side walls arranged to direct the gas stream to flow between said gas entrance and exit and to change the direction of movement of the gas stream between said entrance and exit, whereby dust in said gas stream is projected against said side walls and is guided by said side walls out of the gas stream, and means to wet the gas-contacting surfaces of said side walls.

29. Apparatus for separating dust particles from a gas stream comprising the combination of means to provide a V-shaped compartment adapted to be placed in the gas stream and having a gas entrance at the side and a gas exit at the bottom, and means to wet the inner surface of the wall of said compartment.

30. Apparatus for separating dust particles from a gas stream comprising the combination of means to provide a V-shaped compartment adapted to be placed in the gas stream and having a gas entrance at the side and a gas exit at the bottom, and means to introduce a jet of water directed into said compartment to wet the wall thereof.

31. Apparatus for separating dust particles from a gas stream comprising the combination of means to provide a dead gas space, guiding means to impart a centrifugal motion to the gas stream about an axis substantially parallel to the direction of motion of the gas stream entering said guiding means, and means to introduce water into the gas stream at said guiding means.

32. Apparatus for separating solid particles from a gas stream comprising means to provide a dead gas space, and guiding means to impart a centrifugal motion to the gas stream about an axis disposed substantially parallel to the direction of motion of the gas stream entering said guiding means, with the outer periphery of the gas stream over and in free communication with said dead gas space, and means to introduce water into the gas stream at said guiding means.

33. The combination of a boiler uptake, a dust hopper located therein and comprising a dead gas space, a vertical duct for dust-laden gas having a substantially horizontal outlet for the dust-laden gas over said hopper, and means to introduce water into the dust-laden gas stream as it passes from the outlet of said duct and over the hopper.

34. The combination of a boiler uptake, a dust hopper located therein arranged to divide the uptake in two opposed, substantially vertical passages, said passages having opposed gas outlets at the top arranged to direct opposed gas streams into said uptake substantially horizontally over the dust hopper therein and means to introduce water into the opposed gas streams as they pass from the outlets of said ducts over the hopper.

35. The combination of a boiler uptake, a dust hopper located therein arranged to divide the uptake in two opposed, substantially vertical passages, said passages having opposed gas outlets at the top arranged to direct opposed gas streams into said uptake substantially horizontally over the dust hopper therein, and means to inject water into the gas streams and through the opposed outlets of said ducts.

36. Apparatus for separating dust from a gas stream comprising a vertical flue having a dust pocket comprising a dead gas space at the lower end of the flue, a vertically-disposed gas conduit having a gas exit at the upper end thereof in communication with said flue over said dust pocket arranged to discharge the gas stream substantially horizontally into said flue over said dust pocket and means to introduce water into the path of the gas stream over said dust pocket.

37. Apparatus for separating dust from a gas stream comprising a vertical flue having a dust pocket comprising a dead gas space at the lower end of the flue, a vertically-arranged gas conduit extended externally along said dust pocket having a gas exit at the upper end thereof arranged to discharge the gas stream substantially horizontally into said flue over said dust pocket and means to direct water into the path of the gas stream over said dust pocket.

38. The combination of a boiler uptake, a dust hopper arranged to enclose a dead gas space disposed in said uptake to divide it into two opposed, substantially vertical passages, said passages having opposed gas outlets at the top arranged to direct opposed gas streams into said uptake substantially horizontally over the dead gas space in said hopper and means to direct water into the paths of the opposed gas stream over said hopper.

39. Apparatus for separating dust particles from a hot gas stream, comprising the combination of a source of hot water including means to introduce the hot water in a relatively coarse jet into the hot gas stream in the general direction of travel of said stream to load the dust particles, and means closely adjacent said water-introducing means to remove the loaded dust particles and the water particles from the hot gas stream before the water particles and the gas have been in contact for a material time, whereby the cooling of the hot gas stream is minimized.

In testimony whereof, I have signed my name to this specification.

MAURICE W. CARTY.